Nov. 19, 1957  E. H. PLACKE ET AL  2,813,718
RECORD MATERIAL FEEDING CONTROLS
Filed March 1, 1955  3 Sheets-Sheet 1

INVENTORS
EVERETT H. PLACKE &
HAROLD H. OEHRTMAN
BY
THEIR ATTORNEYS

Nov. 19, 1957 E. H. PLACKE ET AL 2,813,718
RECORD MATERIAL FEEDING CONTROLS
Filed March 1, 1955 3 Sheets-Sheet 2
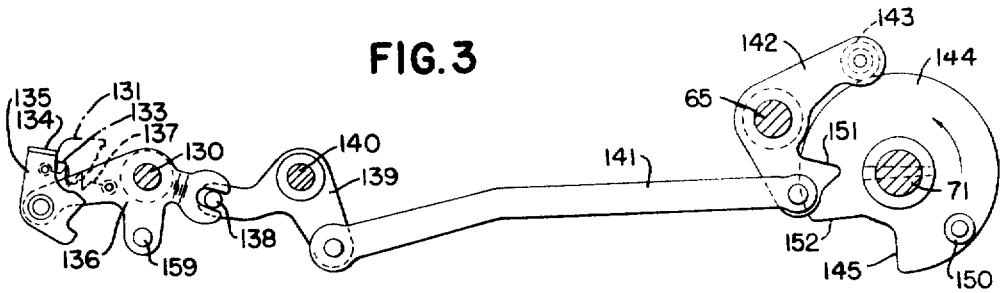
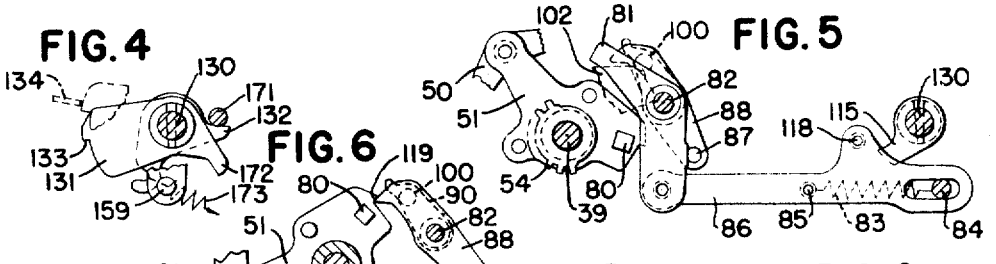
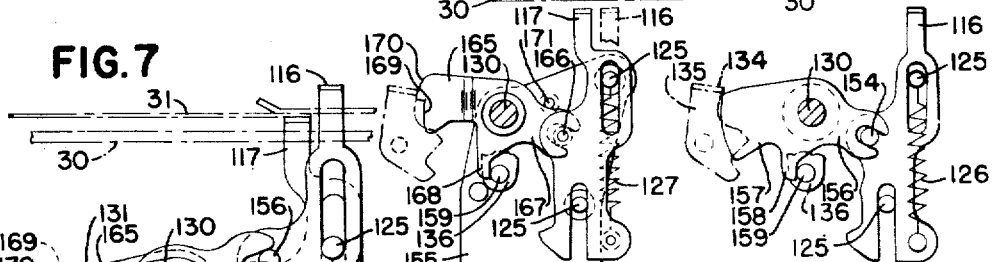
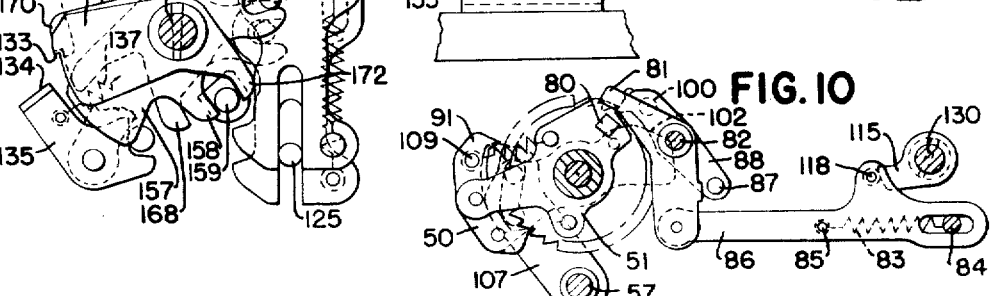
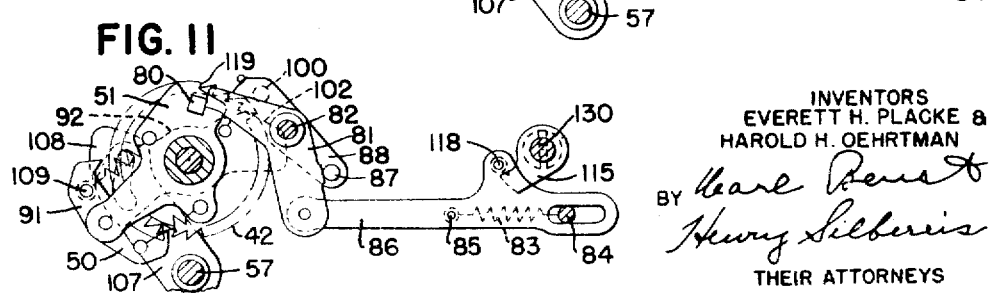
INVENTORS
EVERETT H. PLACKE &
HAROLD H. OEHRTMAN
THEIR ATTORNEYS Nov. 19, 1957     E. H. PLACKE ET AL     2,813,718
RECORD MATERIAL FEEDING CONTROLS
Filed March 1, 1955     3 Sheets-Sheet 3
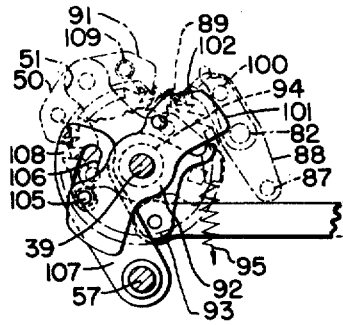
FIG. 12
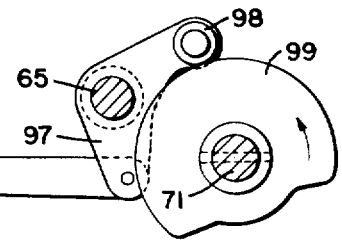
FIG. 13
FIG. 14
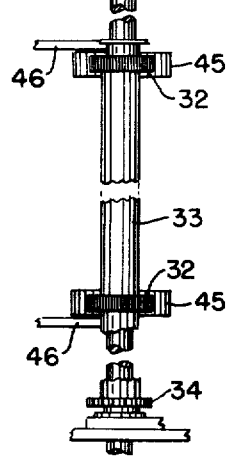
FIG. 15
| | DATE | WITHDRAWAL | DEPOSIT | INTEREST | BALANCE | TRANS. | ACCT. NO |
|---|---|---|---|---|---|---|---|
| 1 | JAN 10-45 | | 3,450.00 | | 3,450.00 | 1 | |
| 2 | JAN 12-45 | | 50.00 | | 3,095.00 | 1 | |
| 3 | JAN 13-45 | 35.00 | | | 3,060.00 | 1 | |
| 4 | JAN 14-45 | | | 5.65 | 3,065.65 | 1 | |
| 5 | JAN 15-45 | | 50.00 | | 3,115.65 | 1 | |
| 6 | JAN 16-45 | | 74.35 | | 3,190.00 | 1 | |
| 7 | JAN 18-45 | | 35.00 | | 3,225.00 | 1 | |
| 8 | JAN 19-45 | | 125.00 | | 3,350.00 | 1 | |
| 9 | JAN 20-45 | 75.00 | | | 3,275.00 | 1 | |
| 10 | JAN 21-45 | | 1,050.00 | | 4,325.00 | 1 | |
| 11 | JAN 22-45 | 450.00 | | | 3,875.00 | 1 | |
| 12 | JAN 23-45 | | 45.00 | | 3,920.00 | 1 | |
| 13 | | | | | | | |
| 14 | | | | | | | |
INVENTORS
EVERETT H. PLACKE &
HAROLD H. OEHRTMAN
BY *Earl Benst*
*Henry Silberis*
THEIR ATTORNEYS

United States Patent Office 2,813,718
Patented Nov. 19, 1957

2,813,718

RECORD MATERIAL FEEDING CONTROLS

Everett H. Placke and Harold H. Oehrtman, Dayton, Ohio, assignors to The National Cash Register Company, Dayton, Ohio, a corporation of Maryland Application March 1, 1955, Serial No. 491,352

14 Claims. (Cl. 271—51)

This invention relates to improvements in accounting machines and the like, and particularly to automatic controls for variably feeding record materials such as a ledger card or a bank pass book.

The object of the invention is to provide an accounting machine with a control to automatically line-space record material variable extents, which control is governed by the location of the record material in the machine.

A specific object of the invention is to provide a variable feed means for feeding record material variable extents, said feed means being controlled by sensing means to sense the location of the record material in the machine.

A more specific object of the invention is to provide a pair of record material sensing means which sense the location of the record material in the machine to control the extent of feed during the next succeeding operation.

With these and incidental objects in view, the invention includes certain novel features of construction and combinations of parts, a preferred form or embodiment of which will be described hereinafter with reference to the drawings which accompany and form a part of this specification.

Of said drawings:

Fig. 3 is a detail view showing the mechanism for actuating the record material sensing means.

Fig. 4 is a detail view of a part of the means controlled by the sensing means.

Fig. 5 is a detail view of a part of the controls for determining the extent of feed of the record material.

Fig. 6 is a detail view showing the parts in moved position for a three-line feed operation.

Fig. 7 is a detail view of the sensing means and the control means set thereby, and shows the operation of the sensing means when the record material is in the position assumed during an operation preceding a three-line feed operation.

Fig. 8 is a detail view showing the control means adjusted by the front sensing device.

Fig. 9 is a detail view showing the control means adjusted by the rear sensing device.

Fig. 10 is a detail view showing the line-space mechanism controls set for a three-line feed.

Fig. 11 is a detail view showing the line-space mechanism controls set for a one-line feed.

Fig. 12 is a detail view showing the operating mechanism for the control elements for controlling the feed and ejecting pawls.

Fig. 13 is a top plan view of the feed rollers.

Fig. 14 is a detail view showing the means controlled from the keyboard of the machine for disabling a three-line feed during balancing operations.

Fig. 15 is a facsimile of a book showing the sensing devices in relation to the end of the book when in the line 12 position.

GENERAL DESCRIPTION

Figure 1:
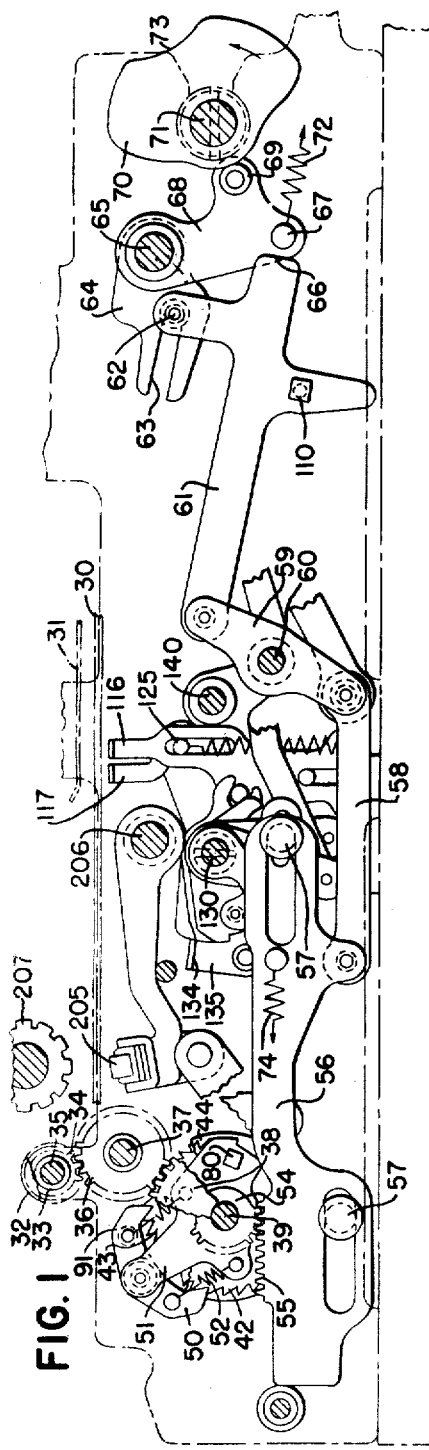
Fig. 1 is a cross sectional view of the printer section of the machine.

The invention is shown applied to a window posting machine such as those used in savings banks, installment payment stores, and the like, where the customer is provided with a pass book, in which entries are made at the time transactions are entered into the machine. As illustrated in the United States patent to Bernis M. Shipley, No. 1,761,542, issued June 3, 1930, the entries are made across the pages, and, since the book is bound at the center, it is not possible to print entries in the area of the binding. For this reason, when the book is in position to receive an entry on line 12, and another entry is to be made on line 13 during a succeeding operation of a series of related operations, the book must be spaced farther than when it is line-spaced in the usual way. As illustrated in the said patent, the space between lines 12 and 13 is equal to three line spaces.

The forms disclosed in the Shipley patent have become standard through long usage. In the Shipley machine, the line on which an entry is made is manually selected by a series of line-finding keys. However, the present invention relates to a means for using the standard pass books in a machine of the type disclosed in the Goodbar et al. United States Patent No. 2,616,623, issued November 4, 1952, and in the co-pending application of Everett H. Placke et al., Serial No. 484,709, filed on January 28, 1955, now Patent No. 2,774,298. In the latter machine, the pass book is automatically line-spaced, and for this reason a mechanism, which is automatically controlled, feeds the book either one space or three spaces, depending upon the position of the book in the machine. A matching ledger card is also used in the system as disclosed in the Shipley patent, and the present invention contemplates feeding the ledger card in the same manner as the book. Duplicate mechanism is provided for handling the ledger card, but only the book-handling mechanism is disclosed herein.

DETAILED DESCRIPTION

The book 29 (Fig. 15) is placed on a table 30 (Fig. 7), beneath a guide shield 31 and a line-selecting indicator (not shown). After the book is in a position corresponding to a selected line, a feed mechanism becomes effective to feed the book toward the printing position. This first feed is normally one line space short of the final position, and, before the printing mechanism is operated, the book is fed the additional line space to position the book into printing position.

The means for effecting the above feeds is as follows:

A pair of feed rollers 32 (Fig. 13) are connected by a sleeve 33, to which is also connected a pinion 34 (Fig. 1) rotatably mounted on a shaft 35. To give more traction in feeding the book, the feed rollers 32 can be made with rubber surfaces. This is particularly desirable in the feeding of records such as pass books, where the pressure necessarily varies with the page on which the data is entered.

A gear 36, rotatably mounted on a stud 37, meshes with the pinion 34 and with a gear 38, secured on a shaft 39, carried by a frame 40 and by a bracket 41. Also secured to the shaft 39 is a pair of ratchet wheels 42 and 43, which are separated by a disk 44, slightly larger in diameter than the ratchets 42 and 43. The ratchets 42 and 43 and the disk 44 are secured together to form a unitary structure.

Rotation of the ratchets 42 and 43, the shaft 39, the gears 38 and 36, and the pinion 34 rotates the feed rollers 32 different extents by means described later.

Coacting with the feed rollers 32 is a pair of tension rollers 45 suitably mounted between two arms 46 in the usual manner. The tension rollers are controlled to resiliently impinge the book 29 against the feed rollers 32 when the book is to be fed into printing position, and when the book is to be ejected from the machine.

The book is fed toward printing position by a feed pawl 50, pivoted on an arm 51 rotatably mounted on the shaft 39. A spring 52 normally maintains the feed pawl 50 in engagement with the ratchet 42. A hub 53 connects the arm 51 with a pinion 54, which meshes with teeth 55 on the upper side of a slide 56, slotted to slide on a pair of studs 57. A link 58 connects the slide 56 with a lever 59 pivoted on a stud 60 carried by the frame 40. A pitman 61 is pivoted to the upper arm of the lever 59 and is provided with a stud 62 guided in a slot 63 of an arm 64 mounted on a shaft 65. The arm 64 normally maintains the end 66 of the pitman 61 in the path of movement of a stud 67 on a cam follower arm 68 loosely mounted on the shaft 65. A roller 69 on the arm 68 is held in engagement with a cam 70, on a cam shaft 71, by a spring 72, connected to the stud 67 and to the frame 40 of the machine.

The cam shaft 71 is rotated one complete rotation in the direction of the arrow (Fig. 1) during each operation of the machine. The cam 70 first rocks the arm 68 clockwise (Fig. 1) to shift the pitman leftwardly and, through the lever 59, shift the slide 56 rightwardly. The slide 56, through the teeth 55, rocks the pinion 54 and the arm 51 counter-clockwise (Fig. 1). During this movement, the feed-pawl 50 rotates the ratchet wheel 42 a like extent to rotate the gears 38 and 36 and the pinion 34 a sufficient extent to cause the feed rollers 32 to feed the book 29 into a position one line space short of the printing position. Thereafter, a low spot 73 on the cam 70 permits the spring 72 to draw the arm 68 a short distance counter-clockwise (Fig. 1). During the counter-clockwise movement of the arm 68, a spring 74 restores the slide 56, the pinion 54, and the arm 51 toward starting position, during which time the pawl 50 ratchets over the ratchet wheel 42.

The extent of movement of the arm 51 and the pawl 50 toward starting position is controlled to cause either one or three line spaces when the arm 51 is again rocked in feeding direction. For this reason, the low spot in the cam 70 is deep enough to permit the arm 51 to recede a distance sufficient for later giving the book a three-line feed.

After the book has been fed from the original position, as above explained, it is necessary to feed the book one line space. To effect this, the return movement of the arm 51 is arrested by a stud 80 on the arm contacting the end of a stop arm 81, pivoted on a stud 82, carried by the frame 40. The stop arm 81 is urged counter-clockwise (Fig. 11) by a spring 83, one end of which is connected to a stud 84, on the frame 40, and the other end of which is connected to a stud 85 on a link 86. The link 86 is connected to the stop arm 81. Thus the spring 83 urges the end of the stop arm 81 into the path of movement of the stud 80. The extent of movement of the stop arm is limited by a stud 87 on a retaining pawl 88 when engaging the ratchet wheel 42.

After the arm 51 has been arrested by the stop arm 81, the cam 70 again rocks the follower arm 68 to cause the stud 67 to pick up the pitman 61 from the arrested position to rock the arm 51 and the pawl 50 counter-clockwise (Figs. 1 and 11) to feed the book one line space into printing position.

The retaining pawl 88 is resiliently held in engagement with the ratchet 42 by a spring 89 (Figs. 2, 6, and 12) connected to an arm 90 hubbed to the pawl 88, and the pawl prevents retrograde movement of the ratchet 42 when the pawl 50 is moved in return direction.

After data has been entered into the machine, it may be desired to eject the book from the machine; to cause the book to remain stationary for another entry in another column of the book; or to line-space the book either one or three line spaces.

The first of said conditions—that is, ejecting the book from the machine—is effected by an ejecting pawl 91, pivoted on the arm 51 and engageable with the ratchet 43. When the book is to be ejected, the pawl 91 must be held in contact with the ratchet 43, and the retaining pawl 88 must be disengaged from the ratchet 42.

The effectiveness of the ejecting pawl 91 and the retaining pawl 88 is controlled by a cam plate 92 (Figs. 2 and 12) rockable on the shaft 39 and connected to an arm 93 by a hub 94. The arm 93 is provided with a hook-shaped end to receive one end of a spring 95, the other end of which is attached to a hook (not shown) on the base of the machine. The spring 95 biases the arm 93 and the cam plate 92 in a clockwise direction (Fig. 12). One end of a link 96 is pivoted to the arm 93, and the other end is pivoted to a cam follower arm 97, pivoted on the shaft 65. The cam follower arm 97 is provided with a roller 98 held in engagement with a cam 99 on the cam shaft 71 by the spring 95.

The cam 99 is timed to control the cam plate 92 to rock clockwise (Fig. 12) under action of the spring 95 after the book has been fed into the machine, to permit the retaining pawl 88 to be lowered to engage the ratchet 42 and to raise the ejecting pawl 91 out of engagement with the ratchet 43, so that, when the arm 51 is moved clockwise preparatory to line-spacing the book, the retaining pawl 88 holds the ratchets 42 and 43 against rotation, and the ejecting pawl is ineffective. At this time, the feed pawl 50 ratchets over the ratchet wheel 42. After the line-spacing has been completed, the cam 99 restores the cam plate 92 to normal position.

To control the effectiveness of the retaining pawl 88, the arm 90, connected thereto, is provided with a stud 100, normally held in engagement with an outer surface 101 of the cam plate 92 by the spring 89, to maintain the retaining pawl 88 out of engagement with the ratchet 42. When the cam plate 92 is rocked clockwise (Fig. 12) under control of the cam 99, a cam surface 102 thereon permits the spring 89 to rock the arm 90 and the retaining pawl 88 into engagement with the ratchet wheel 42.

The cam plate 92 is provided with a stud 105, projecting into a cam slot 106 on an arm 107 pivoted on the left-hand stud 57 (Fig. 1). The surface 108 of the arm 107 is located in the path of movement of a stud 109 on the ejecting pawl 91, and, at the time the cam plate 92 is actuated by the cam 99, the stud 109 is in engagement with the surface 108. Rocking of the cam plate 92, through the stud 105 moving in the cam slot 106, rocks the arm 107 to engage the stud 109 and lift the ejecting pawl 91 out of engagement with the ratchet wheel 43, to permit the line-feeding mechanism to line-space the book. After the book has been line-spaced and an entry has been made thereon, the cam 99 returns the cam plate 92 to original position to lower the ejecting pawl into engagement with the ratchet wheel 43 and raise the retaining pawl 88 out of engagement with the ratchet wheel 42.

In those operations wherein the book is to be ejected, the slide 56 is permitted to move its fullest extent to actuate the arm 51, which, through the ejecting pawl 91, thereby rotates the feed rollers an extent sufficient to eject the book.

In those operations wherein the book is not ejected, an arm (not shown), controlled from the keyboard of the machine, moves into the path of return movement of a stud 110 (Fig. 1) to arrest the pitman 61 in its moved position, in the manner fully described in the above-mentioned co-pending application.

As described hereinbefore, the stop arm 81, coacting with the stud 80 (Fig. 11), controls the feeding mechanism to line-space the book during certain operations. After an entry has been made on line 12 (Fig. 15) of the book 29, it is necessary to feed the book the equivalent of three line spaces. The reason for this is that the book is bound at the center 112, and legible prints cannot be recorded in this area. For this reason, line 13 of the book is located on the next succeeding page of the book. The construction of the book makes it necessary to so modify the feed controls that three line spaces are obtained when the book is fed from line 12. The controls for effecting this modification are effected by a pair of feelers 116 and 117.

Figure 2:
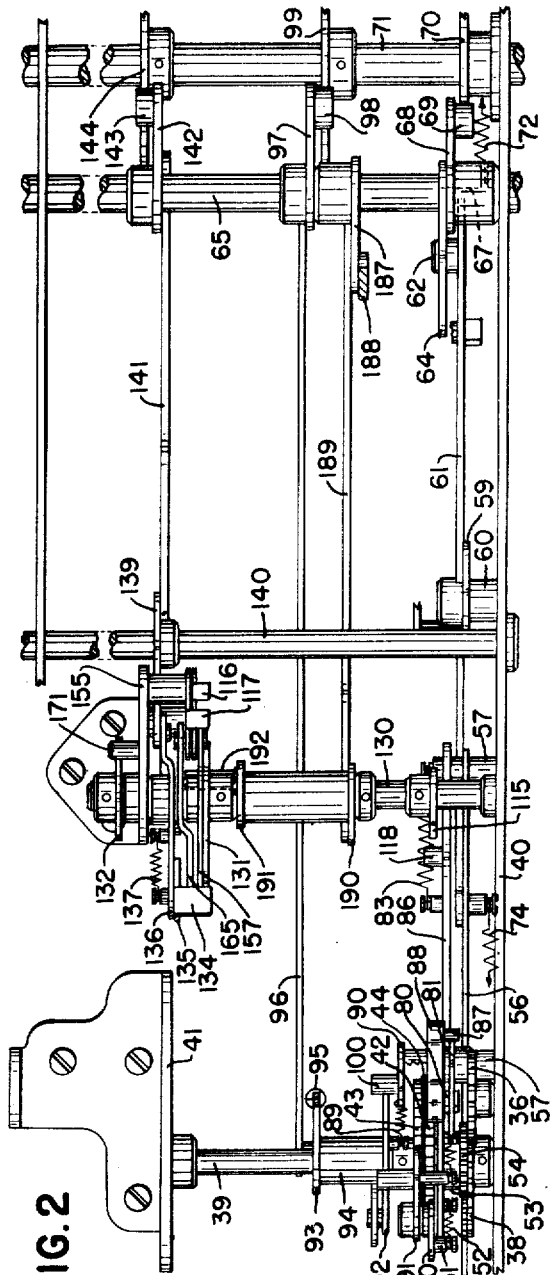
Fig. 2 is a top plan view of the feeding and sensing control means.

When a three-line-space feed is necessary, a stop arm 115 (Figs. 5, 10, and 11) is moved under control of the feeler 116 from the Fig. 11 position into the Fig. 10 position, while the link 86 is in its left-hand position. The link 86 is held in said left-hand position by the retaining pawl 88 through the stud 87 engaging the stop arm 81. When moved into the Fig. 10 position, the stop arm 115 lies in the path of movement of a stud 118, and therefore, when the cam plate 92 lowers the retaining pawl 88, the stop arm 81 is arrested by the stop arm 115 before the stop arm 81 is moved far enough to be positioned into the path of movement of the stud 80. The positions of these parts under this adjustment is illustrated in Fig. 10. Therefore, when the arm 51 is rocked clockwise (Fig. 10) preparatory to a feed operation, the stud 80 moves beneath the stop arm 81 and continues to move until arrested by a shoulder 119 (Fig. 6) engaging the end of the retaining pawl 88. The retaining pawl 88 is wide enough to span both the ratchet wheel 42 and the arm 51, as illustrated in Fig. 2.

The movement obtained by the shoulder 119 engaging the end of the retaining pawl 88 is sufficient to feed the book from line 12 (Fig. 15) to line 13 when the arm 51 is returned in feeding direction in the manner described above.

Feeler mechanism

As above mentioned, the positioning of the stop arm 115 (Figs. 5, 10, and 11) is controlled by two feelers, 116 and 117 (see also Figs. 1, 7, 8, and 9). The feelers are slotted to slide on two studs 125 and are urged upwardly by springs 126 and 127, respectively, to sense for the presence and location of the book 29 on the table 30. The table 30 is provided with openings through which the feelers 116 and 117 can be projected.

The mechanism controlled by the feelers 116 and 117 is such that, when both feelers are arrested by the book located in the paths thereof, the stop arm 115 is not moved out of the Fig. 11 position. When the book is in position out of range of the feelers 116 and 117, the stop arm 115 is likewise not moved out of the Fig. 11 position. However, when the book is in position to receive entries on line 12, the feeler 117 is arrested by the book, and the feeler 116 misses the book and therefore moves its greatest extent. This condition is indicated in Fig. 15. Under this adjustment of the feelers 116 and 117, the stop arm 115 is moved into the Fig. 10 position and, as before described, causes the book to be fed from the line 12 position into the line 13 position.

The stop arm 115 is secured to a shaft 130, to which are also secured an arm 131 and an arm 132 (Figs. 2 and 4). The arm 131 is provided with a shoulder 133, and a flange 134 of a coupling pawl 135 may be selectively moved beneath the shoulder 133. The coupling pawl 135 (Fig. 3) is pivoted on a lever 136 and is resiliently urged toward the arm 131 by a spring 137. The lever 136 is rotatably mounted on the shaft 130, and one arm of the lever is bifurcated to engage a stud 138 on a bell crank 139, pivoted on a shaft 140. One arm of the bell crank 139 has connected thereto a link 141, and the other end of the link is pivoted to a cam follower arm 142, mounted on the shaft 65. The cam follower arm 142 is provided with a roller 143, held in engagement with a cam 144, on the cam shaft 71, by the springs 126 and 127, in the manner described hereinafter.

When the cam 144 rotates in the direction of the arrow (Fig. 3), a clearance cut 145 in the cam 144 permits the roller 143 to move to rock the cam follower arm 142 and shift the link 141 leftwardly (Fig. 3) to rock the bell crank 139 and the lever 136 to lower the coupling pawl 135. If certain obstructions, described later, do not prevent it, the flange 134 moves behind the shoulder 133 on the arm 131. Thereafter, when the cam 144 reverses the movement of the lever 136, the flange 134, engaging the shoulder 133, rocks the arm 131 clockwise (Fig. 4) to rock the shaft 130 and the stop arm 115 clockwise (Figs. 9 and 11) to position to stop arm 115 in the path of the stud 118 for controlling the feed mechanism in the manner described hereinbefore.

A means, comprising a stud 150, is provided to positively rock the cam follower arm 142 when the clearance cut 145 moves into position to free the roller 143. The stud 150 engages a cam edge 151 on the cam follower arm 142 to rock the latter clockwise (Fig. 3). The cam surface 152, engaging the roller 143, restores the cam follower arm 142 and its connecting mechanism to home position, during which time the pawl 135 moves the arm 131 whenever the flange 134 is permitted to move behind the shoulder 133.

Whether or not the flange 134 of the pawl 135 can move behind the shoulder 133 is controlled by the feelers 116 and 117.

As before mentioned, the feelers 116 and 117 are slidably mounted on studs 125. The studs 125 are carried by a bracket 155 (Figs. 2 and 8).

The feeler 116 is provided with a stud 154, projecting into a bifurcated end of an arm 156, extending from a segment 157, mounted on the shaft 130. The segment 157 has a toe 158, extending downwardly therefrom, where it engages a stud 159 on the beforementioned lever 136. When the lever 136 is rocked under control of the cam 144, the stud 159 permits the segment 157 to rotate, thus raising the feeler 116. Movement of the lever 136 is prevented until the clearance cut 145 of the cam 144 frees the cam follower arm 142, whereupon the segment 157 and the feeler 116 are permitted to be operated by the spring 126. The segment 157 is located adjacent the arm 131, and the flange 134 of the coupling pawl extends over both.

When the feeler 116 senses the presence of a book in its path, the feeler moves only a short distance, where it is arrested by the book. In such event, the segment 157 moves a short distance counter-clockwise (Fig. 9), which is not far enough to move beyond the shoulder 133. Therefore, when the pawl 135 is moved downwardly, the flange 134 engages the outer periphery of the segment 157, and therefore the segment 157 prevents the flange 134 from dropping in behind the shoulder 133.

When the feeler 116 is not arrested by a book—as, for example, when the book is in the position illustrated in Fig. 15—the feeler 116 rises to the position illustrated in Fig. 7. In this event, the segment 157 moves clockwise past the position which the flange 134 assumes when in its moved position, thus permitting the spring 137 to move the flange 134 of the coupling pawl behind the shoulder 133 of the arm 131. In this setting, the shaft 130 and the stop arm 115 will be rocked, provided a segment 165 (Fig. 8), adjusted under control of the feeler 117, does not prevent movement of the coupling pawl 135.

The feeler 117 is provided with a stud 166, engaged by a bifurcated end of an arm 167, formed on the segment 165. A toe 168, extending downwardly from the segment 165, engages the stud 159 on the lever 136. Therefore, when the lever 136 is rocked under control of the cam 144, the stud 159 permits the segment 165 to rotate, thus raising the feeler 117. If the feeler 117 is arrested by contacting the book, as shown in Fig. 7, a cut-away portion 169 of the segment 165 is positioned into the path of movement of the flange 134, thus permitting the flange 134 to move behind the shoulder 133 of the arm 131, and, when the cam 144 restores the lever 136 to home position, the flange 134, engaging the shoulder 133, rocks the shaft 130 and the stop arm 115 to the position shown in Fig. 10.

When the feeler 117 is not arrested by a book, the feeler moves its greatest extent, which moves the segment 165 far enough to position the outer periphery 170 of the segment 165 into the path of movement of the flange 134, thus preventing rocking of arm 131, shaft 130, and stop arm 115 to the Fig. 10 position.

From the above it is seen that, only when the feeler 117 is held down and the feeler 116 is permitted to rise, is the stop arm 115 moved to control the feeding mechanism for a three-line feed. When both feelers are held down, as is the case when the book is in position to print on lines 13 and up, or when both feelers are released, as is the case when the book is in position to receive entries on lines 1 to 11, only one line-feed can be performed.

The arm 131, the shaft 130, and the stop arm 115 are held in home position by a spring 173 (Fig. 4), connected to the arm 132, secured to the shaft 130. The arm 132 is held in engagement with a stud 171 on the bracket 155 by the spring 173.

When the arm 131 is moved by the pawl 135, a toe 172 thereon is moved into the path of movement of the stud 159. Therefore, when the lever 136 is restored to home position after the arm 131 was moved, the stud 159 restores the arm 131 to normal position.

Feeler throwoff controls

Machines of the class to which the present invention is shown applied are provided with a keyboard, as illustrated in the above-mentioned Goodbar et al. patent and co-pending application. The keys on the keyboard select columns in which entries are made. The present invention is controlled by certain control keys to print balances, sub-balances, and the like in a separate column, as shown in Fig. 15. When such entries are made in the Balance column, it is desired to print them on the same line as the last item entered in one of the other columns of the book.

When, for example, the item $45.00 (Fig. 15) is entered on line 12, the feelers set up such a condition that, during the succeeding operation, the book would normally be fed three line spaces. However, it is desired to print the balance—for example, $3,920.00 (Fig. 15)—on the same line with the Deposit item. Under this condition, the three-line feed must be disabled.

To obtain this result, a means is provided to prevent operation of the feelers 116 and 117 during the operations in which the line-spacing is to be disabled.

After the Balance is printed, the book is ejected from the machine in the manner described in the above-mentioned application.

As described in said patent and application, the transaction bank of keys adjusts a control plate 175 (Fig. 14), rotatably mounted on a disk 176. The control plate 175 is provided with internal teeth 177, meshing with the teeth of a pinion 178, mounted on a square shaft 179, differentially positioned by a conventional differential mechanism under control of depressible control keys. The control plate is illustrated herein with notches 180 in the 1, 3, and 5 positions, which positions correspond to the position of the keys in the key bank. When the machine is operated with a key in either of said three positions depressed, the corresponding notch 180 is moved into the path of movement of the end of a feeler slide 181. The feeler slide 181 is guided on a rod 182, and one end thereof is connected to an arm 183 of a lever 184, pivoted on a shaft 185. A second arm 186 of the lever 184 is connected to a bell crank 187 by a link 188. The bell crank 187 is pivoted on the shaft 65. A link 189 connects the bell crank 187 to an arm 190, pivoted on the shaft 130. Hubbed to the arm 190 is an arm 191, provided with a stud 192, which is engageable with shoulders 193 on the feelers 116 and 117.

A pair of cams 195, on a cam shaft 196, actuates a cam follower arm 197, pinned on a shaft 185. Secured to the shaft 185 is an arm 198, normally maintaining the arm 186 in elevated position by the engagement of a stud 199 on the arm 186 with said arm 198. A spring 200, stretched between the rod 182 and a stud on the arm 183, maintains the stud 199 in engagement with the arm 198.

When, during an operation of the machine, a notch 180 is positioned in the path of movement of the feeler 181, and the cams 195 rock the arm 198 clockwise (Fig. 14), the spring 200 shifts the feeler into a notch 180 and, through the link 188, the bell crank 187, and the link 189, rocks the arms 190 and 191 to position the stud 192 over the shoulders 193 of the feelers 116 and 117 to hold the feelers down, thus preventing setting up the controls for a three-space feed during the operation following an operation with a key in either the 1, 3, or 5 position depressed. During such operations, the book is ejected from the machine.

A hammer 205, like those shown and fully described in the above-mentioned patent and application, is pivoted on a shaft 206 and takes impressions from type wheels 207, in the usual manner.

While the form of mechanism shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In a machine of the class described, the combination of feeding means for record material, means to normally control the feeding means to feed the record material one line-space, a plurality of feelers located in the path of movement of the record material when the feeding means feeds the record material, for sensing the location of the record material in the machine, and means settable under control of the feelers when the record material has been fed into a position in respect to the feelers wherein one feeler contacts the record material while the other feeler does not contact the record material, to control the feeding means to feed the record material a distance equalling more than one line-space.

2. In a machine of the class described, the combination of feeding means for record material, means to control the feeding means to feed the record material one line-space, two feelers located adjacent each other and in the path of movement of the record material when fed by the feeding means, whereby the record material may be fed into a position to arrest one feeler, both feelers, or no feeler, said feelers when both are arrested by the record material, or when neither is arrested by the record material, to cause said means to control feeding means to be set to cause one line-space, and means settable under control of both feelers when one feeler is arrested by the record material and the other is not arrested by the record material to control the feeding means to feed the record material a distance equalling more than one line-space.

3. In a machine of the class described, the combination of feeding means for record material, means to retract the feeding means preparatory to feeding the record material, a first stop to arrest the feeding means after being retracted a distance equal to one line-space, a second stop to arrest the feeding means after being retracted a distance equal to a plurality of line-spaces, a pair of feelers located in the path of movement of the record material when the record material is moved by said feeding means, said feeding means adapted to feed the record material step by step until the record material is in position to be sensed by one or both of said feelers, and means controlled by the pair of feelers to render the first stop ineffective and to render the second stop effective.

4. In a machine of the class described, the combination of feeding means for record material, means to retract the feeding means preparatory to feeding the record material, a first stop to arrest the feeding means after being retracted a distance equal to one line-space, a second stop to arrest the feeding means after being retracted a distance equal to a plurality of line-spaces, a pair of feelers located in the path of movement of the record material when the record material is moved by said feeding means, said feeding means adapted to feed the record material step by step until the record material is in position to be sensed by one or both of said feelers, and means controlled by the pair of feelers when only one of said pair of feelers senses the record material to render the first stop ineffective and to render the second stop effective.

5. In a machine of the class described, the combination of feeding means for record material, means to retract the feeding means preparatory to feeding the record material, a first stop to arrest the feeding means after being retracted a distance equal to one line-space, a second stop to arrest the feeding means after being retracted a distance equal to a plurality of line-spaces, a pair of feelers located in the path of movement of the record material when the record material is moved by said feeding means, said feeding means adapted to feed the record material step by step until the record material is in position to be sensed by one or both of said feelers, means controlled by one of said feelers when sensing record material to render the first stop means ineffective and to render the second stop means effective, and means controlled by the other one of said feelers when arrested by record material to disable the control of the said one of said feelers.

6. In a machine of the class described, the combination of feeding means for record material, means to retract the feeding means preparatory to feeding the record material, a first stop to arrest the feeding means after being retracted a distance equal to one line-space, a pair of feelers, a second stop to arrest the feeding means after being retracted a distance equal to a plurality of line-spaces, operating means to withdraw said first stop from stopping position, a settable device to maintain said first stop in the withdrawn position, power-operated means including a coupling pawl to move the settable device into position to maintain said first stop in withdrawn position, a member engageable by the coupling pawl and connected to the settable device whereby the settable device is adjusted to said moved position, feelers for sensing the location of the record material, and blocking means adjusted by the feelers to disable the coupling pawl to prevent movement of the settable device to said moved position when both feelers either sense the record material, or both feelers do not sense the record material.

7. In a machine of the class described, the combination of feeding means for record material, means to retract the feeding means preparatory to feeding the record material, a first stop to arrest the feeding means after being retracted a distance equal to one line-space, a pair of feelers, a second stop to arrest the feeding means after being retracted a distance equal to a plurality of line-spaces, operating means to withdraw said first stop from stopping position, a settable device to maintain said first stop in the withdrawn position, power-operated means including a coupling pawl to move the settable device into position to maintain said first stop in withdrawn position, a member engageable by the coupling pawl and connected to the settable device whereby the settable device is moved to said moved position, feelers for sensing the location of the record material, a blocking device connected to one feeler to prevent the coupling pawl from engaging said member when said one feeler is not arrested by record material, and a second blocking device connected to a second one of said feelers to prevent the coupling device from engaging said member when said second feeler is arrested by record material, said blocking devices adjusted to position to free the coupling pawl to engage the member when the said first feeler is arrested by record material and the second feeler is not arrested by record material whereby the coupling pawl moves the settable device into moved position.

8. In a machine of the class described, the combination of a feeding mechanism to feed record material, said feeding mechanism including a ratchet wheel, a ratchet pawl, and a rockable arm for supporting the ratchet pawl, said rockable arm retractable to ratchet the pawl over the ratchet wheel preparatory to rotating the ratchet wheel, a first projection on the rockable arm, a movable stop in the path of said projection to arrest the retracting movement of the rockable arm after moving a distance far enough to feed the record material one line space upon being restored in feeding direction, a second projection on the rockable arm, a stop in the path of movement of the second projection to arrest the rockable arm after being retracted a distance far enough to feed the record material a plurality of line spaces upon being restored in feeding direction, a pair of feelers, means to withdraw the first stop out of the path of movement of the first projection, and means jointly controlled by the pair of feelers to maintain the first stop in said withdrawn position to permit the second projection to engage said second stop.

9. In a machine of the class described, the combination of feeding means for record material, means to normally control the feeding means to feed the record material one line space, a plurality of feelers for sensing the location of the record material in the machine, means settable under control of the feelers when one feeler contacts the record material while the other feeler does not contact the record material to control the feeding means to feed the record material a distance equalling more than one line space, a control plate differentially set during a machine operation, and means controlled by the control plate to disable both feelers.

10. In a machine of the class described, the combination of feeding means for record material, means to control the feeding means to feed the record material one line space, two feelers located adjacent each other for sensing the location of the record material in the machine, said feeler when both are arrested by the record material, or when both are not arrested by the record material to cause said means to control the record material to be set to cause one line space, means settable under control of both feelers when one feeler contacts the record material and the other does not contact the record material to control the feeding means to feed the record material a distance equalling more than one line space, a control plate differentially set during a machine operation, and means controlled by the control plate to disable both feelers.

11. In a machine of the class described, the combination of feeding means for record material, means to retract the feeding means preparatory to feeding the record material, a first stop to arrest the feeding means after being retracted a distance equal to one line space, a second stop to arrest the feeding means after being retracted a distance equal to a plurality of line spaces, a pair of feelers located in the path of movement of the record material when the record material is moved by said feeding means, said feeding means adapted to feed the record material step by step until the record material is in position to be sensed by one or both of said feelers, means controlled by the pair of feelers to render the first stop ineffective and to render the second stop effective, a control plate differentially set during a machine operation, and means controlled by the control plate to disable both feelers.

12. In a machine of the class described, the combination of feeding means for record material, means to retract the feeding means preparatory to feeding the record material, a first stop to arrest the feeding means after being retracted a distance equal to one line space, a pair of feelers, a second stop to arrest the feeding means after being retracted a distance equal to a plurality of line spaces, operating means to withdraw said first stop from stopping position, a settable device to maintain said first stop in the withdrawn position, power-operated means including a coupling pawl to move the settable device into position to maintain said first stop in withdrawn position, a member engageable by the coupling pawl and connected to the settable device whereby the settable device is moved to said moved position, feelers for sensing the location of the record material, blocking means adjusted by the feelers to disable the coupling pawl to prevent movement of the settable device to said moved position when both feelers either sense the record material, or both feelers do not sense the record material, a control plate differentially set during a machine operation, and means controlled by the control plate to disable both feelers.

13. In a machine of the class described, the combination of feeding means for record material, means to retract the feeding means preparatory to feed in the record material, a first stop to arrest the feeding means after being retracted a distance equal to one line space, a pair of feelers, a second stop to arrest the feeding means after being retracted a distance equal to a plurality of line spaces, operating means to withdraw said first stop from stopping position, a settable device to maintain said first stop in the withdrawn position, power-operated means including a coupling pawl to move the settable device into position to maintain the first stop in withdrawn position, a member engageable by the coupling pawl and connected to the settable device whereby the settable device is moved to said moved position, feelers for sensing the location of the record material, a blocking device connected to one feeler to prevent the coupling pawl from engaging said member when said one feeler is not arrested by record material, a second blocking device connected to a second one of said feelers to prevent the coupling device from engaging said member when said second feeler is arrested by record material, said blocking devices adjusted to position to free the coupling pawl to engage the member when the said first feeler is arrested by record material and the second feeler is not arrested by record material whereby the coupling pawl moves the settable device into moved position, a control plate differentially set during a machine operation, and means controlled by the control plate to disable both feelers.

14. In a machine of the class described, the combination of a feeding mechanism to feed record material, said feeding mechanism including a ratchet wheel, a ratchet pawl, and a rockable arm for supporting the ratchet pawl, said rockable arm retractable to ratchet the pawl over the ratchet wheel preparatory to rotating the ratchet wheel, a first projection on the rockable arm, a movable stop in the path of said projection to arrest the retracting movement of the rockable arm after moving a distance far enough to feed the record material one line space upon being restored in feeding direction, a second projection on the rockable arm, a stop in the path of movement of the the second projection to arrest the rockable arm after being retracted a distance far enough to feed the record material a plurality of line spaces upon being restored in feeding direction, a pair of feelers, means to withdraw the first stop out of the path of movement of the first projection, means jointly controlled by the pair of feelers to maintain the first stop in said withdrawn position to permit the second projection to engage said second stop, a control plate differentially set during a machine operation, and means controlled by the control plate to disable both feelers.

References Cited in the file of this patent

UNITED STATES PATENTS

| | | |
|---|---|---|
| 1,773,145 | Kassner | Aug. 19, 1930 |
| 1,983,698 | Kaufman | Dec. 11, 1934 |
| 2,050,022 | Shipley | Aug. 4, 1936 |
| 2,242,381 | Aurbach | May 20, 1941 |
| 2,373,510 | Spurlind | Apr. 10, 1945 |
| 2,616,623 | Goodbar | Nov. 4, 1952 |

UNITED STATES PATENT OFFICE

CERTIFICATE OF CORRECTION

Patent No. 2,813,718 November 19, 1957

Everett H. Placke et al.

It is hereby certified that error appears in the printed specification of the above numbered patent requiring correction and that the said Letters Patent should read as corrected below.

Column 4, line 46, for "on", first occurrence, read -- of --; column 6, line 11, for "to", second occurrence, read -- the --; column 8, line 53, after "control" insert -- the --; column 11, line 20, for "feed in" read -- feeding --; column 12, line 19, strike out "the", first occurrence.

Signed and sealed this 14th day of January 1958.

(SEAL)

Attest:
KARL H. AXLINE
Attesting Officer

ROBERT C. WATSON
Commissioner of Patents